United States Patent Office 3,387,944
Patented June 11, 1968

3,387,944
BATCH SEPARATION OF COMPONENTS OF A
MIXTURE BY TOTAL SOLUTE REFLUX
Leonard George Sherrington and William Palmer Kemp,
Vicars Cross, Chester, England, assignors to Thorium
Limited, London, England, a British company
Continuation-in-part of application Ser. No. 466,744,
June 24, 1965, which is a continuation-in-part of
application Ser. No. 223,395, Sept. 13, 1962. This
application Apr. 18, 1967, Ser. No. 631,748
6 Claims. (Cl. 23—310)

ABSTRACT OF THE DISCLOSURE

A liquid-liquid extraction process for separating a mixture of at least two solutes with different solubilities in two immiscible solvents of different specific gravities involving the flow of the two solvents-containing-solutes in counter-current relation to one another in a multi-stage separating system with the total reflux of solutes at both ends of the separating region until the desired separation has been achieved, stopping the counter-current flow when the desired separation of the solutes has been achieved, followed by the removal of the desired components from the appropriate stages of the multi-stage system.

---

This application is a continuation-in-part of our application Ser. No. 466,744 filed June 24, 1965 which is in turn a continuation-in-part of our earlier application Ser. No. 223,395 filed Sept. 13, 1962 and now abandoned.

This invention relates to the separation of components from a mixture, and relates more especially to the separation of components from a mixture by solvent extraction. The principles of solvent extraction are well known and are described in detail in "Chemical Engineering Handbook," 3rd edition, by J. H. Perry.

The existing techniques of continuous counter-current solvent extraction separate a mixture of two components. If a mixture of three components A, B and C is to be separated by known procedures, two successive processes are needed, i.e. one process separates one component A from any B and C and then another and subsequent process separates B from C. With more than three components, even more successive and subsequent operations are necessary.

Very similar problems are met in the better known procedure of fractional distillation. A brief description of this helps to illustrate the problems of separating a mixture of two closely similar components by solvent extraction. Separating two liquids with similar boiling points is carried out in a distillation column. Vapour rises up the column making intimate contact with the liquid phase flowing down the column. The vapour reaching the top of the column is condensed or refluxed at the top and the liquid returned to the column. When starting such a separation it is useful to reflux and return all the condensate to the column until the more volatile component dominates the mixture refluxing at the top. This is known as operating under total reflux. To obtain a finite yield of the most volatile component, part of the condensate at the top of the column is returned to the column and part of it is diverted to form the product. The ratio of these is called the reflux ratio and it is this ratio which controls the separation. Liquids with closely similar boiling points are difficult to separate and require high reflux ratios or most of the condensate of the process is returned to the column. Thus the production rate in a difficult separation is low.

In distillation, separation depends on a difference in volatility of the two components being separated. In solvent extraction separation depends on the difference in solubility of two components in two substantially immiscible liquid solvents. For convenience in connection with the hereinafter set forth inventive aspects, the two solvents are referred to as an organic phase S2 and an aqueous phase S1 as this is a common procedure. However, it is not to be suggested that this invention is limited to this precise sort of solvent combination.

Counter-current solvent extraction is commonly carried out in columns but for the purposes of describing this invention, separation using mixer-settlers is preferred. These are well known in the art. Each mixer-settler corresponds roughly to one theoretical stage in which the two phases meet and are mixed continuously and the mixture over-flows to the settler where light and heavy phases separate. These two phases flow in opposite directions to neighbouring mixer-settlers when multistage processes are operated.

The separation of rare earths by solvent extraction is difficult because neighbouring rare earths in the series have similar solubilities. Modern references suggest that ion exchange is the most useful method for separating rare earths as these procedures have advanced more rapidly than solvent extraction methods. This invention changes this position and enables rare earths to be separated readily by solvent extraction.

It is the primary object of the present invention to provide a batch solvent extraction process operated under "total reflux." By that term, as used in this specification the inventors mean a complete retention of solutes within the system and a separation of them within the system by liquid/liquid partition until a steady state is reached.

Although the term "total reflux" has been mooted before it has solely been considered as a theoretical limit enabling one to calculate the number of stages to be used for a given degree of separation in a plant needing continuous removal of solutes; no-one has previously considered using a "total reflux" system in practice. Contrary to this advice, the inventors have found that a workable batch system can be used under total reflux. Hitherto it has not been shown how to operate any batch extraction with "total reflux" at each end, still less has it been shown how to operate a rare earth/TBP (tributylphosphate) water system under such batch total reflux conditions. Even though TBP/water has been known as an extracting system for rare earths in a continuous process, there was no prior disclosure that it could be used for the process of the present invention and give good separation and no untoward effects at the end stages where the reflux has most effect; in fact, since "total reflux" has hitherto only been considered as a theoretical limit undesirable in practice, there could not be such practical knowledge.

The invention in a broad aspect, accordingly envisages a batch method for the simultaneous separation of a mixture of two or more solutes having different partition coefficients between the two solvents into its component solutes, comprising the steps of: dissolving the mixture of solutes in at least one solvent of two at least partially immiscible solvents; passing the resultant solution and the other of said solvents in counter-current flow through a multi-stage liquid/liquid extraction system; returning any solutes leaving each end of the liquid/liquid system to that end of the system from which they have come; continuing this return of solutes to the system until a substantially steady-state condition has been reached; and then removing the contents of those stages of the multi-stage system in which the desired components have become relatively concentrated.

In a more especial embodiment of the invention, such a batch method is applied to the simultaneous separation of a mixture of salts of two or more rare earths into its component salts, using as the pair of solvents tributyl-phosphate and water.

Any method of obtaining total reflux may be used. Thus it may be obtained by stripping one outgoing solvent phase to transfer completely the solutes contained therein to the other solvent. The solution thus formed is then returned to the end of the separating region from which the solutes in the solution were derived. All of the solutes are thus returned for further separation. Stripping is preferably carried out using a relatively large flow of the other solvent phase, which is then concentrated before being returned for further separation.

Alternatively, total reflux may be attained by concentrating one out-going solution and returning the solute obtained to the end of the installation from which it has come, in a more concentrated form. It may be evaporated to dryness and then taken up in the solvent phase entering at the end of the installation from which it has come.

As a further alternative reflux of solutes may also be achieved by chemical means. However, as recycle of solvents is usually, for economic reasons, to be preferred chemical methods of reflux are not often used as they often preclude recycle of the solvent. It must be clearly borne in mind that solute reflux and solvent recycle are not the same:

(a) solvent recycle is carried out to the other end of the extraction system from which it was derived; further, the recycled solvent contains no solutes.
(b) solute reflux is carried out to the same end of the extraction system from which it was derived.

Of course, one method of obtaining total reflux may be used at one end, and another at the other end, of the installation; moreover, as a preferred feature, one or both solvents may be recycled. When the salts to be separated are rare earth nitrates, advantageous modifications of the process may be used. One comprises precipitating the rare earth elements in an outgoing solvent phase by the addition of an alkaline-reacting material selected from the group consisting of hydroxides and carbonates; dissolving the said precipitate in acid; and returning the resulting solution of rare earth elements to the end of the separating region from which they came.

It is an advantageous feature of the invention that contents of extraction stages may be removed from intermediate stages as well as end stages, since concentration peaks of the various components are set up. The quantity of units which will contain the desired products will be determined by the proportions of solutes initially present.

An interesting feature of the total reflux condition is that separation achieved per unit is a maximum. The equilibrium state reached under total reflux is defined by the following equation:

$$\frac{A_1}{B_1} \bigg/ \frac{A_n}{B_n} = \beta^{(n-1)}$$

where A and B are two components being separated $A_1/B_1$ is the ratio of these components in one of the solvent phases in the 1st mixer settler and $A_n/B_n$ is the ratio in the same solvent phase in the $n$th mixer settler. $\beta$ is the separation factor and is the ratio of the partition coefficients of A and B between the two solvents.

In separating several components say A, B, C, D, one component will be less readily extracted by the lighter solvent than the others. Let this be component A and consider the separation factors $\beta_{BA}$, $\beta_{CA}$ and $\beta_{DA}$ where $\beta_{BA}$, etc., is the ratio of the distribution coefficients of B, etc. over that of A.

The separation of the multicomponent mixture will tend to form a series of bands of the various components as shown in the examples and the bands will be in order of increasing value of $\beta_{BA}$ etc. The separation of any pair of neighbouring bands then requires a minimum number of stages to give a required purity. This is again given by the above relationship. If for example the mixture A, B, C, D separates in the order A, B, C, D, the minimum number of stages between B and C is given by:

$$\frac{C_n}{B_n} \bigg/ \frac{C_1}{B_1} = \beta_{CB}^{(n-1)}$$

($\beta_{CB}$ is the same numerically as $\beta_{CA}/\beta_{BA}$).

Under total reflux conditions the flow of solutes in the one solvent is balanced by the flow of solutes carried by the other solvent in the opposite direction. The components to be separated are initially dissolved in each of the two solvents at the desired concentration and the two phase mixture thus formed is initially charged to the units of the separating region. The actual ratio of solvents used is partially determined by the need of having two phases in the separating region. Countercurrent flow is established. The installation is then operated under total reflux until the desired separation is obtained.

The products of the process consist of the solutes obtained by emptying those units which contain the desired solutes at a desired purity. The position of these units in the series of mixer settler units which makes up the separating region is calculable from the above formula. However, the time required at total reflux in order to achieve a pre-designated level of purity of product can only be found by the application periodically of one or other of the methods of analysis known in the art. When the desired separation is obtained the counter-current flow relationship is stopped and those units which contain the desired solutes at a desired purity are emptied.

For example, if three components are being separated and a sufficient number of units is used concentrates of the components can be withdrawn from the two ends and from some of the middle units.

The invention will be further described with reference to the accompanying drawings, in which.

Figure 1:
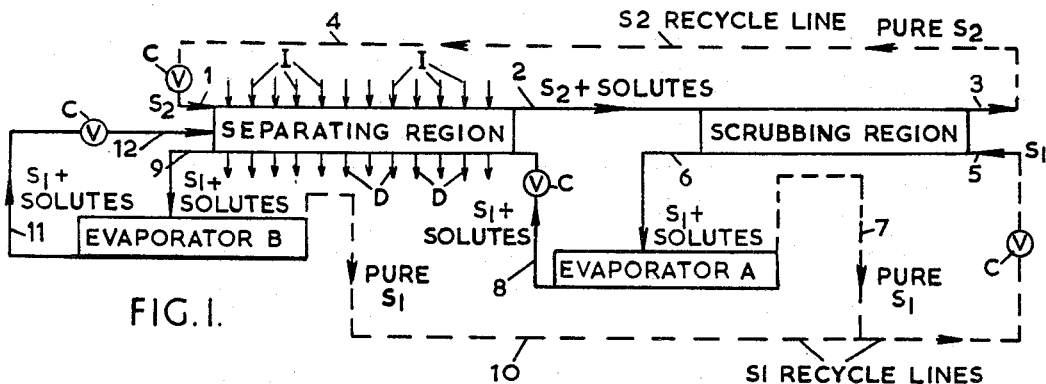
FIGURE 1 shows in diagrammatic form a separating installation according to the invention in the form of a liquid/liquid countercurrent extraction installation.

The liquid/liquid separating installation of FIGURE 1 comprises a separating region, consisting of a plurality of mixer-settler countercurrent stages as known per se, a scrubbing region consisting of similar mixer-settler stages, and two evaporators A and B. I denotes inlets through which the solvent solutions are initially added to the mixed-settler stages or units as described above. D denotes outlets for emptying stages or units as described above.

When this installation is in operation, two solvent phases S1 and S2 flow in countercurrent through the installation. S2 flows into one end of the separating region through inlet 1, leaves the other end of the separating region and flows via flow line 2 to the inlet end of the scrubbing region and thence through outlet 3 through recycle line 4 to inlet 1 again. S1 flows into the inlet end of the scrubbing region through inlet 5 and out through outlet 6 into evaporator A, where a proportion is evaporated off and returned to inlet 5 through recycle line 7.

The remainder of S1 passes out of evaporator A and into the said other end of the separating region by flow line 8. S1 leaves said one end of the separating region by outlet 9 and passes into evaporator B, where more of S1 is removed and passing through recycle line 10 joins the recycle line 7 and hence is connected to inlet 5. The remaining S1 passes out of the evaporator B by outlet 11 and into said one end of the separating region by inlet 12.

Figure 4:
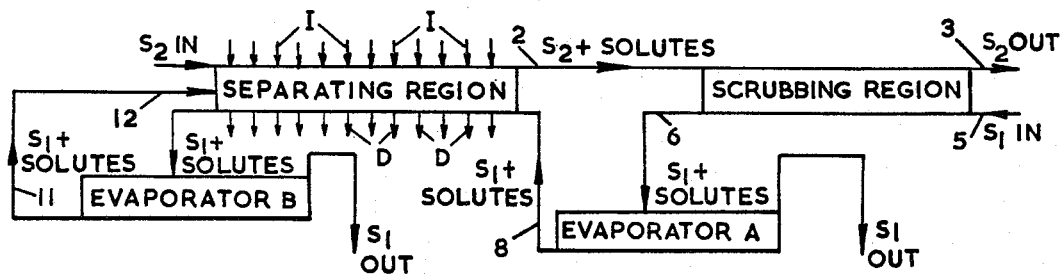
FIGURE 4 shows an installation similar to that of FIGURE 1 but omitting the recycle of solvents.

The preceding paragraph, for clarity, deals only with the passage of solvents through the system. In terms of the actual extraction process, S1 scrubs the outgoing solution phase S2 free from solutes and is then decreased in bulk in evaporator A to a predetermined solute concentration. This concentrated solution of S1 and solutes is then passed in countercurrent flow with S2 phase, i.e. solution of S2 and solutes through the separating region, thus giving a distribution of solutes within the separating region. The S1 solution phase emerging into line 9 is again decreased in bulk in evaporator B, and then recycled into the S1-outlet end of the separating region via inlet line 12. It will be clear that the two decreases in bulk should be equivalent to the amount of S1 used, so that there is no net flow of solvent out of the installation. It is obviously convenient for solvent S2 to be recycled, since it enters and leaves the installation in pure form; moreover, if necessary solvent S1 can be condensed and recycled from the two evaporators. These two recycling steps are however not strictly necessary to the method according to the invention, as shown in FIG. 4

In the procedure as shown in this figure, there is a continuous feed and continuous withdrawal of pure solvents S1 and S2. However, there is no feed or withdrawal of solutes when the system is operating under total reflux.

It will be clear from the above that total reflux of the solutes is achieved in the refluxing arrangement at both ends of the separating region. The solutes leaving the separating region in solvent S2 are transferred in the scrubbing region to solvent S1 and are carried through line 6 to the evaporator. Pure solvent S1 is evaporated off in the evaporator and the solutes are returned with the remainder of solvent S1 to the separating region through line 8. On the other hand, the solutes being carried out of the separating region by the solvent S1 through line 9 are carried to the evaporator B where pure sovent S1 is evaporated off. The solutes are then carried with the remaining solvent S1 through line 11 and inlet 12 back to the separating region.

Figure 2:
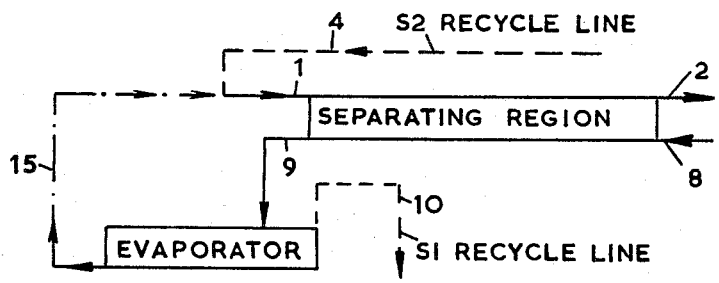
FIGURES 2 and 3 show one end of the installation with alternative means of bringing about reflux.
Figure 3:
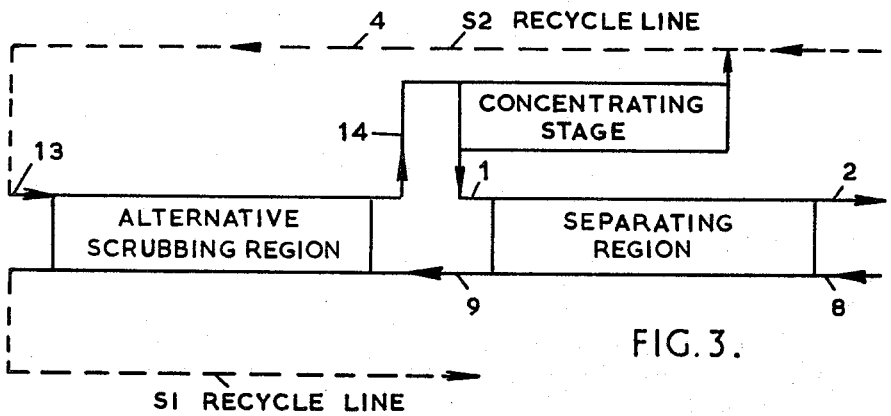

The scrubbing region with its associated evaporator A, and the evaporator B, perform equivalent functions. Thus, the method according to the invention could equally well be carried out with a scrubbing region plus evaporator at each end, or with an evaporator alone at each end, or with some other combination. FIGURE 3, for example, shows an alternative scrubbing region at the S2 inlet end (S2 entering at inlet 13 and leaving through line 14) for scrubbing the S1-out completely, S2 solution phase passing through line 14 into, and being concentrated at, a concentrating stage before being fed back at 1 as S2 feed to the separating region. FIGURE 2 shows an alternative form of evaporator which can be used for the function of evaporator alone. In this, the solutes are evaporated to dryness and taken up in the S2 feed, as shown by chain-dotted flow line 15.

The operation described above may be carried out until equilibrium is reached in the separating region. It will be clear that no solute is removed from the system in a solvent stream, since pure solvent is recovered (and usually recycled). In other words, a condition of "total reflux" will obtain and equilibrium will eventually be reached. When equilibrium is approached, the counter-current flow relationship is stopped, and the stages of the separating region in which the desired solute is relatively concentrated are emptied for further processing. Those stages may be refilled and the counter-current flow relationship may then be re-established.

In practicing the invention in accordance with FIGURE 1, the system is initially charged with the solutes and the solvents. Solutions of the solutes in each or either of the solvents may be charged into the separating region via inlets I. Further solution and/or solvent is supplied from charging tanks to the inlets 1 and 8 and flow from the charging tanks is continued until the separating region and the refluxing arrangements at both ends are fully charged. If recycle of solvents is to be utilized, charging is continued until the recycle lines are filled. The charging through inlets 1 and 8 initiates counter-current flow in the separating region, but once the system is charged the counter-current flow is maintained by other means. If the solvents are recycled, counter-current flow is maintained by continuous reintroduction of solvent at inlet 1 and at inlet 5 of the scrubbing region. If the solvents are not recycled, fresh solvent (without solutes) is introduced at these inlets.

Counter-current flow is continued for a time sufficient to provide a plurality of volume changes within the multi-stage liquid/liquid extraction system so that the desired separation has been obtained within the stages in accordance with the partition coefficients of the solutes. Then the counter-current flow relationship through the extraction system is ceased, such as by manipulating the valves denoted at C to stop flow. Valves C may each have a holding tank associated with it in the flow line to even out the flow. Then at least one stage of the multi-stage liquid/liquid extraction system in which a desired concentration of a solute has collected is emptied via discharge outlets D.

Although the above description has taken the case of two solutes in detail, the method of the present invention is not limited to such a case and is in fact especially useful for separations involving more than two solutes as shown in the examples.

The invention is particularly useful in providing a batch method for the simultaneous separation of a mixture of at least two rare earth solutes having different partition co-efficients relative to first and second non-mutually reactive solvents of different specific gravities. As set forth hereinafter, the solutes in one example comprise praseodymium and neodymium nitrates. At least one of the solvents is an organic solvent such as TBP and the other is water.

Figure 5:
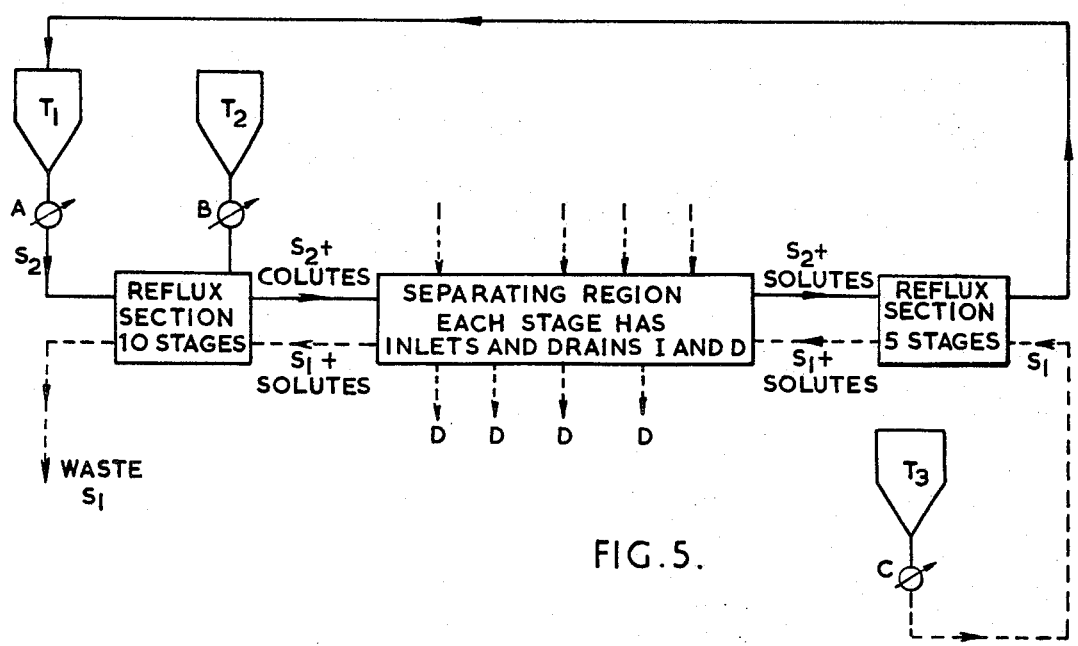
FIGURE 5 shows an alternative form of separating installation which is particularly suitable for carrying out the procedure of Examples 4 and 5 below.

FIGURE 5 shows a system in which one of the solvents is recycled and the other is not recycled. Operation of the system is described in Examples 4 and 5 below.

Examples 1 to 3 below illustrate methods of separating rare earth nitrates using counter-current streams of tributyl phosphate (TBP) and water. Alternative solvent systems for separating rare earth salts include (i) a system in which $S_2$ is an equal parts by volume mixture of TBP and Shellsol A (a hydrocarbon fraction marketed by Shell Chemical Co.) and $S_1$ is ethylene glycol. (ii) a system in which $S_2$ is a solution of 50% by volume of isooctanoic acid (a liquid secondary $C_8$ carboxylic acid marketed by Imperial Chemical Industries Ltd.) in Shellsol A and $S_1$ is water.

The invention is useful for separating mixtures of components other than rare earth salts. Example 4 illustrates the separation of a mixture of methyl phenols which is typical of the product from a tar acid distillation. These phenols have almost identical boiling points and are very difficult to separate by conventional means. Example 5 illustrates the separation of cobalt and nickel which are metals of almost identical atomic weight. These examples are only given by way of illustration, and the method of the invention can be used to separate the members of any group of related chemical compounds which have different solubilities in two different solvents.

Example 1

The method of operation of the process is first described with reference to FIGURE 1 of the accompanying drawings, in which S2 is TBP (tributylphosphate) and S1 is an aqueous stream. Praseodymium and neodymium nitrates were dissolved in TBP to give a concentration of rare earths of 285 grams per litre as nitrates. A similar aqueous solution but containing 690 grams per litre as nitrates was also made up, and these two solutions were placed in the mixed-settlers of the separating region via inlets I to each mixer-settler to fill the same (in this case 12 stages were used) and made to flow in countercurrent relationship by feeding further aqueous solution of 690 grams per litre as nitrates concentration in at the inlet 8, i.e. the aqueous phase inlet end at 4.6 ml./min. and pure TBP in at inlet 1, i.e. at the aqueous out end at 10 ml./min.

In practice it is found advantageous for both phases to initially contain the mixture of solutes, since the time otherwise needed for this to be brought about by extraction is thereby saved.

The TBP leaving at the aqueous inlet end via line 2 contains rare earth nitrates and this solution is accordingly scrubbed in the scrubbing region (which in this case has five stages) with a relatively large amount of pure water entering at 5 (20 ml./min.) so that all the rare earth nitrates are removed and total reflux is obtained. The relatively weak aqueous solution leaving the scrubbing region at 6 is concentrated in evaporator A to 690 grams per litre as nitrates and fed into the aqueous-phase inlet end of the separating region via inlet 8 at 4.6 ml./min. as the aqueous feed while the scrubbed TBP leaving at 3 is recycled through line 4 and fed back to the aqueous outlet end of the separating region via inlet 1. Clearly when the counter-flow relationship has been established for long enough for the concentrated solution from evaporator A to become the aqueous feed it is no longer necessary to supply further aqueous solution from outside the system. Similarly once recycling of the TBP is established there is no need to supply further pure TBP. If water is also recycled through lines 7 and 10 as shown in FIGURE 1 then the operation becomes a completely closed system as shown in FIGURE 1 and as described with reference to FIGURE 1.

At the aqueous phase outlet end 9 of the separating region the aqueous solution is again concentrated to 690 grams per litre as nitrates by evaporator B and fed back to the aqueous phase outlet end by line 11 and inlet 12 at 10 ml./min. This brings about total reflux at this end, since evaporation to 690 grams per litre as nitrates at each end ensures that the 20 ml./min. of water entering is all evaporated.

If desired, the water evaporated by evaporator A and B can be recycled by lines 7 and 10 to inlet 5. The time required for one volume change was given by the total volume of both solvents in the 12-mixer-settler stages divided by the combined rate of 14.6 ml./min. The process was continued for sufficient time to give four volume changes.

Upon stopping of the counter-current flow relationship an analysis of the aqueous phases in the 12-stage section gave the following results:

| Unit No.: | Pr/Nd Ratio |
|---|---|
| 1 | 4.8 |
| 2 | 4.1 |
| 3 | 3.0 |
| 4 | 2.0 |
| 5 | 1.5 |
| 6 | 1.2 |
| 7 | .8 |
| 8 | .6 |
| 9 | .4 |
| 10 | .29 |
| 11 | .21 |
| 12 | .16 |

The contents of the end stages were then removed and treated to recover the rare earths.

Example 2

Separation of a praseodymium concentrate from lanthanum, neodymium and yttrium and other rare earths was achieved in a similar experiment using 21 units. Analysis after 5 volume changes shows the following results:

ANALYSIS OF UNITS

| | Percent Pr$_6$O$_{11}$ | Percent Nd$_2$O$_3$ | Percent Rest [1] |
|---|---|---|---|
| Unit No.: | | | |
| 1 | 0.7 | | [2] 99.3 |
| 3 | 2.6 | | 97.3 |
| 5 | 10.2 | 0.17 | 89.6 |
| 7 | 35.5 | 0.8 | 59.6 |
| 9 | 67.5 | 2.1 | 30.4 |
| 11 | 86.4 | 3.8 | 9.8 |
| 13 | 88.2 | 6.5 | 5.3 |
| 15 | 81.7 | 11.3 | 7.0 |
| 17 | 66.0 | 16.8 | 17.2 |
| 19 | 43.7 | 17.7 | 33.6 |
| 21 | 21.6 | 12.9 | [3] 65.5 |

[1] Any La, Y and other earths included in this figure.
[2] Mainly La$_2$O$_3$.
[3] Mainly Y and other earths.

It will be observed from the above example that a useful concentrate can collect in intermediate stages of the installation and simultaneous separation of Pr, La, Nd, Y and other earths achieved.

Thus, the invention is not limited to separating two components, but when equilibrium is set up there may be a peak concentration of a component in some intermediate stage of the separator.

Example 3

A similar experiment was carried out using 50 stages of mixer-settlers. A mixture of rare earths was separated consisting mainly of lanthanum, praseodymium, neodymium, samarium, yttrium and small amounts of the heavy earths.

After four volume changes the mixer settler units were analyzed and gave the following results for certain units containing suitable concentrates:

| | Percent Pr$_6$O$_{11}$ | Percent Nd$_2$O$_3$ | Percent other R.E. oxides |
|---|---|---|---|
| Unit No.: | | | |
| 1–19 (inclusive) | 0.01 | | ([1]) |
| 28 | 57.6 | 1.0 | 41.4 |
| 29 | 80.2 | 1.9 | 17.9 |
| 30 | 89.5 | 3.0 | 7.5 |
| 31 | 92.7 | 4.9 | 2.4 |
| 32 | 91.3 | 6.8 | 1.9 |
| 33 | 88.7 | 10.6 | 0.7 |
| 45 | 10.4 | 89.1 | 0.5 |
| 46 | 8.6 | 91.1 | 0.3 |
| 47 | 6.1 | 91.5 | 2.4 |
| 48 | 4.6 | 90.1 | 5.3 |
| 49 | 3.6 | 88.2 | 8.2 |
| 50 | 2.6 | 79.8 | 17.6 |

[1] Ca. 100% La$_2$O$_3$.

NOTE.—Other rare earths in Nos. 28–33 mainly La$_2$O$_3$. In Nos. 45–50 other rare earths Sm$_2$O$_{31}$, Y$_2$O$_3$ and heavies.

Useful lanthanum, praseodymium and neodymium products were thus obtained in the one experiment.

Example 4.—Separation of methyl phenols

This example is described with reference to FIGURE 5.

The mixture of phenols—which is typical of the product from a tar acid distillation—had the following approximate analysis:

| | Percent |
|---|---|
| 2,6-xylenol | 15 |
| p-Cresol | 48 |
| m-Cresol | 37 |

Two solutions were prepared.

Aqueous phase– S1: 10% w./w. of phenols in 4.5% w./w. sodium hydroxide solution.

Organic phase; S2: 10% w./w. of phenols in benzene.

Total solution volume: Aqueous S1: 4,800 mls., Organic S2: 4,800 ml.

These solutions were then charged to the 32 stages, each holding 300 mls., of the Separating Region via the inlets I, with the drains D closed, and the metering pumps A, B and C all shut off so that no solvent flows occurred. More benzene was added to tank T1, aqueous sulphuric acid to tank T2 and further fresh sodium hydroxide to tank T3. Countercurrent flow through the 32 stages of the separating region was then obtained by starting pumps A, B and C; with the 300 ml. volume units in use here, these flow rates were all set at 1 litre per hour.

Reflux of solutes at each end of the separating region was achieved in the following manner.

(a) Organic phase S2 out end: by contacting the benzene solution with fresh 4.5% sodium hydroxide in a 5 stage reflux section: total transfer of phenols from S2 to S1 is thus achieved.

(b) Aqueous phase S1, out end: by neutralizing the out-going aqueous solution with acid fed in to the 10 stage reflux section from tank T2 by pump B and contacting with fresh benzene in counter current from Tank T1, via pump A, to dissolve the phenols thus thrown out of solution. Due to the doubling in size of the amount of aqueous phase passing through this reflux section the mixer settlers used here were of 600 ml. capacity; both of the aqueous phase S1 and the acid feed meet in the mixer section of the first stage of the reflux section. The aqueous material then leaving this reflux section is discarded; it can, optionally, be stored and later checked to ensure total removal of phenols.

Using these two different forms of reflux, the plant was then run at total reflux until 3 volume changes had occurred in the separating region. The three metering pumps were then stopped; analysis of the aqueous phases then gave the following results:

| Unit No.: | 2,6-xylenol | p-Cresol | m-Cresol |
|---|---|---|---|
| 1 | 100.0 | Nil | Nil |
| 3 | 99.9 | 0.1 | 0.0 |
| 4 | 97.8 | 2.2 | 0.0 |
| 5 | 81.1 | 18.7 | 0.2 |
| 6 | 19.9 | 78.5 | 1.6 |
| 7 | 2.3 | 95.2 | 2.5 |
| 8 | 0.1 | 96.2 | 3.7 |
| 9 | | 95.1 | 4.9 |
| 11 | | 91.4 | 8.6 |
| 13 | | 86.1 | 13.9 |
| 15 | | 78.9 | 21.1 |
| 18 | | 64.6 | 35.4 |
| 21 | | 47.9 | 52.1 |
| 24 | | 30.2 | 69.8 |
| 26 | | 19.9 | 80.1 |
| 28 | | 12.1 | 87.9 |
| 30 | | 6.6 | 93.4 |
| 31 | | 4.7 | 95.3 |
| 32 | | 3.2 | 96.8 |

Thus compounds of the stated desired purity were obtained by emptying the following units of the separating region

| Unit No.: | Product | Purity |
|---|---|---|
| 1–4 | 2,6-xylenol | Greater than 98%. |
| 8–11 | p-Cresol | Greater than 95%. |
| 30–32 | m-Cresol | do. |

These units were refilled with fresh mixture and the flows restarted to achieve another batch separation; after 3 volume changes these same units contained the same substances as above at the same purity; these were recovered by stopping the pumps A, B and C again, and opening the relevant drains D, into suitable receivers.

The phenols were then recovered from the drained solutions by standard process techniques.

Example 5.—Separation of cobalt and nickel

The same system was used for this as for the phenols, except that the separating region was decreased to 25 units.

The initial feed material had the following approximate composition: Nickel: 50%, Cobalt: 50%, as a mixture of sulphates ($MSO_4$). The following solutions were used:

Organic phase S2: 1.0 molar naphthenic acid containing 11 gm./litre metals. This is prepared by contacting 1.0 molar naphthenic acid with a 29 gm./litre solution of the mixed sulphates in 0.7 molar aqueous sodium hydroxide.

Aqueous phase S1; 37 gm./litre solution of the mixed sulphates in water.

For the 25 units in use, 3,750 ml. of each solution were required. These solutions were charged into the separating region, and further naphthenic acid solution into Tank T1. Tank T2 is filled with 0.3 molar sodium hydroxide and Tank T3 with aqueous sulphuric acid of 0.23 N strength. Counter current flow through the separating region was then obtained by setting the pumps as follows:

Pump A: 1.0 litre/hour
Pumps B and C: 0.785 litre/hour.

Reflux was achieved at each end of the separating region in the following fashion.

(a) Aqueous phase, S1 out ends: by mixing, in the mixer portion of the first unit of the reflux section, with sodium hydroxide solution from tank T2 the aqueous phase is made alkaline; the metal ions are then transferred into the organic phase by contact with the naphthenic acid solution flowing through the reflux section from tank T1. The waste aqueous solution can, optionally, be stored and later checked for total removal of metal values.

(b) Organic phase, S2, out end: by contacting the naphthenic acid solution with 0.24 N sulphuric acid in water flowing through the reflux section from tank T3.

Using these two different forms of reflux, the plant was then run at total reflux until 3 volume changes had occurred in the separating region. The three metering pumps were then stopped; analysis of the aqueous phases in the units of the separating region then gave the following results:

| | Relative Percentage | |
|---|---|---|
| | Cobalt | Nickel |
| Unit No.: | | |
| 1 | 99.4 | 0.6 |
| 2 | 99.0 | 1.0 |
| 3 | 98.5 | 1.5 |
| 4 | 97.6 | 2.4 |
| 5 | 96.4 | 3.6 |
| 6 | 94.8 | 5.2 |
| 7 | 92.3 | 7.5 |
| 8 | 89.4 | 10.6 |
| 9 | 85.3 | 14.7 |
| 10 | 80.1 | 19.9 |
| 11 | 73.6 | 26.4 |
| 12 | 65.9 | 34.1 |
| 13 | 57.3 | 42.7 |
| 14 | 48.2 | 51.8 |
| 15 | 39.3 | 60.7 |
| 16 | 30.9 | 69.1 |
| 17 | 23.7 | 76.3 |
| 18 | 17.6 | 82.4 |
| 19 | 12.7 | 87.3 |
| 20 | 9.0 | 91.0 |
| 21 | 6.2 | 93.8 |
| 22 | 4.2 | 95.8 |
| 23 | 2.7 | 97.3 |
| 24 | 1.7 | 98.3 |
| 25 | 1.0 | 99.0 |

Thus units 1–5 contain nickel at the desired purity of over 97% and units 21–25 contain cobalt at the desired purity of over 96%. These units were emptied via the drains D, and refilled with fresh solutions S1 and S2. The pumps A, B and C were then restarted at the same settings and a second batchwise separation carried out. Nickel and cobalt of the desired purity again collects in the end units; after stopping the pumps these can again be drained into suitable receivers.

The metal values are recovered from the drained solutions by conventional processing techniques.

Of course the above examples are only illustrative in

We claim:

1. A solvent extraction process for separating a mixture of at least two solute components having different solubilities in two immiscible solvents of different specific gravities which comprises (1) supplying the mixture of solute components as a fixed charge and the two solvents to a solvent extraction system having a multi-stage separating region and a solute-refluxing section at each end of said separating region, said multi-stage separating region having a plurality of stages the contents of each of which can be removed separately from the contents of the others of said stages, said solute components being dissolved in said solvents as solutes, (2) establishing a counter-current flow by passing each of said solvents carrying solutes in counter-current past the other of said solvents carrying solutes in said multi-stage separating region, (3) receiving said one solvent with solutes carried therein at one end of said separating region and refluxing all of said solutes back to the same one end of said separating region, (4) receiving the said other solvent carrying solutes at the said other end of the separating region and refluxing all of said solutes back to the said other end of the separating region, (5) said refluxing at each end of said separating region taking place without any solutes being continuously withdrawn from the system, and (6) when the required separation has been achieved in the multi-stage separating region in which the desired components are each concentrated in a different stage, stopping the counter-current flow of said solvents carrying solutes throughout the extraction system and then removing the respective desired components from the stages containing said desired components.

2. A process according to claim 1 in which at least 3 components are simultaneously concentrated in at least 3 different stages of the extraction system prior to stopping the counter-current flow of said solvents carrying solutes throughout the extraction system.

3. A process according to claim 1 wherein the mixture is a mixture of rare earth salts.

4. A process according to claim 1 wherein the mixture is a mixture of methylphenols.

5. A process according to claim 1 wherein the mixture is a mixture of cobalt and nickel.

6. A process according to claim 3 wherein the solvents are tributyl phosphate and water.

References Cited

UNITED STATES PATENTS

| | | | |
|---|---|---|---|
| 3,128,156 | 4/1964 | Long | 23—312 |
| 3,177,196 | 4/1965 | Scheibel | 260—97.6 |
| 3,235,607 | 2/1966 | Fritzsche | 260—627 |

FOREIGN PATENTS

| | | |
|---|---|---|
| 825,208 | 12/1959 | Great Britain. |
| 583,757 | 9/1959 | Canada. |

OTHER REFERENCES

Perry: Chemical Engineer's Handbook, 3rd ed., 1950 pp. 716 to 718, 733 to 739.

Weaver et al.: Oak Ridge National Lab., O.R.N.L.-2863, Feb. 12, 1960, copy 23–312, pp. 1 to 23.

NORMAN YUDKOFF, *Primary Examiner.*

S. J. EMERY, *Assistant Examiner.*